US006774328B2

(12) United States Patent
Adams et al.

(10) Patent No.: US 6,774,328 B2
(45) Date of Patent: Aug. 10, 2004

(54) DIMMER HAVING A THERMALLY INSULATED FACEPLATE FASTENER

(75) Inventors: Jason O. Adams, Emmaus, PA (US); Gregory S. Altonen, Easton, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/143,438

(22) Filed: May 10, 2002

(65) Prior Publication Data

US 2003/0209996 A1 Nov. 13, 2003

(51) Int. Cl.[7] .................................................. H02J 3/12
(52) U.S. Cl. ....................................... 200/329; 200/333
(58) Field of Search ................................ 200/333, 329, 200/905, 339, 320, 330, 335, 297, 308; 315/56, 60; 361/357; 362/95

(56) References Cited

U.S. PATENT DOCUMENTS 4,924,349 A * 5/1990 Buehler et al. ............. 200/297
4,939,383 A * 7/1990 Tucker et al. ............... 200/335
5,359,231 A * 10/1994 Flowers et al. ............. 200/335
6,459,250 B1 * 10/2002 Davis ......................... 200/333
2003/0089587 A1 * 5/2003 Mayo et al. ................ 200/329

* cited by examiner

*Primary Examiner*—Wilson Lee
(74) *Attorney, Agent, or Firm*—Mark E. Rose

(57) ABSTRACT

A light dimmer capable of receiving a faceplate fastener while thermally insulating the fastener from a heat-generating device, such as a triac or a field-effect transistor, is presented. In a preferred embodiment, the dimmer includes a thermally insulating boss integrally formed with the body of the dimmer such that the boss includes a fastener-receiving aperture adapted to be axially aligned with the fastener-receiving openings of the faceplate. In addition, the dimmer includes a heat-dissipating aluminum yoke to which the heat-generating device is in thermal communication, thereby allowing the yoke to act as a heat sink. The yoke has a fastener-receiving aperture formed therein in axial alignment with the fastener-receiving aperture of the thermally insulating boss, with the yoke fastener-receiving aperture proportioned to receive the fastener there-through in non-contacting relationship.

19 Claims, 3 Drawing Sheets

DIMMER HAVING A THERMALLY INSULATED FACEPLATE FASTENER

FIELD OF THE INVENTION

The invention relates to the fastening of faceplates to heat-dissipating electrical power switching devices, and more particularly, to thermally conductive faceplate fasteners securing faceplates to electrical light dimmers.

BACKGROUND OF THE INVENTION

A typical prior art electrical light dimmer 10, shown in FIGS. 1 and 2, includes a body portion 14, that is ordinarily mounted in a wallbox 16, that is recess-mounted in a wall or the like. To give the dimmer a neat, clean appearance, a faceplate 18, defining a switch opening 20 therein, is usually mounted to the front of the dimmer 10 by means of fasteners 22, which are most often threaded screws.

The dimmer 10 includes a heat generating device 30, such as a triac, a field-effect transistor, or the like. In order to dissipate or carry away the heat generated by the heat generating device 30, the device is often mounted in thermal communication with a yoke 32 having a relatively high thermal conductivity, and is typically made of a metal such as aluminum. In addition to acting as a heat sink for the heat generating device 30, the yoke 32 also typically functions as a structural element to which is attached the dimmer body portion 14 and the faceplate 18.

For attaching the faceplate 18 to the yoke 32 with screws 22, the yoke 32 is usually provided with threaded holes 34 for receiving the screws 22.

Because the screws 22 are typically made of metal, a thermally conducting material, heat from the heat generating device 30 can be, and often is, transferred from the heat generating device 30, through the heat sink (or yoke) 32, to the screws 22.

In normal operation, this results in the screws 22 having a temperature greater than the ambient temperature of the environment in which the dimmer 10 is located. This poses no danger to any person or object that might come into contact with the screws 22. However, some people may find undesirable the sensation of faceplate screws 22 that feel warm to the touch. Accordingly, there is a need to provide a means for fastening a faceplate to a dimmer with screws while maintaining the temperature of the screws closer in temperature to the ambient temperature.

SUMMARY OF THE INVENTION

In accordance with the present invention, a dimmer capable of having a faceplate attached thereto by means of fasteners that are thermally insulated from any heat generating devices internal to the dimmer is presented. By thermally insulating the fasteners from any heat generating devices and their associated heat sinks, the faceplate fasteners remain at a temperature closer to that of ambient.

In addition, by thermally insulating the faceplate fasteners from any heat generating devices and heat sinks, the manufacturing of the dimmer can be simplified with a resulting lower manufacturing cost because, for example, there is no longer any need to thread the yoke.

In one embodiment, the dimmer includes a heat dissipating yoke having a first aperture therethrough for allowing the fastener to extend through or past the yoke without contacting the yoke in thermal relationship. The dimmer includes a boss defining a second aperture in axial alignment with the first aperture for receiving the fastener therein. The boss is made of a thermally insulating material, preferably having a thermal conductivity no greater than a predetermined value, such as a thermoplastic, and has a portion that extends through the first aperture to a point flush with a faceplate confronting surface of the yoke.

These and other features and advantages of the present invention will be more readily apparent from the detailed description set forth below taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein.

In the following description, the same or similar elements are labeled with the same or similar reference numbers.

DETAILED DESCRIPTION OF ILLUSTRATIVE EMBODIMENTS

Figure 3:
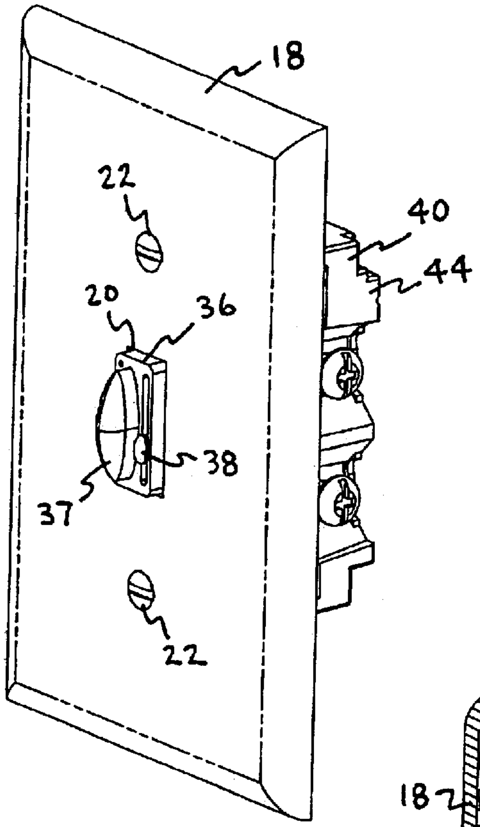
FIG. 3 is a perspective view of a dimmer switch with a faceplate mounted thereon.
Figure 2:
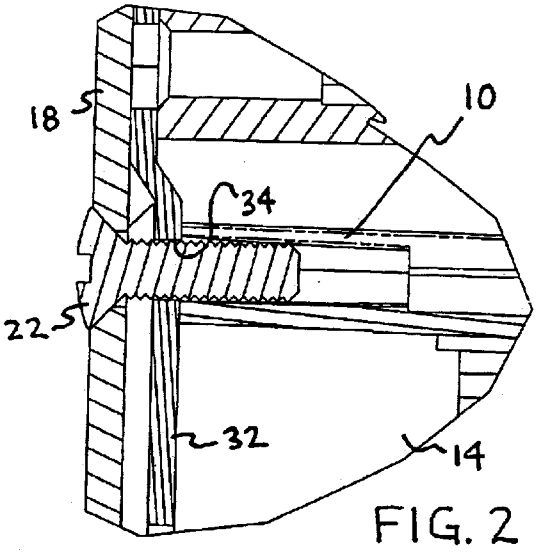
FIG. 2 PRIOR ART
FIG. 2 is a detailed view in cross-section of the prior art dimmer of FIG. 2 illustrating the fastening of the faceplate to the yoke with a screw.
Figure 1:
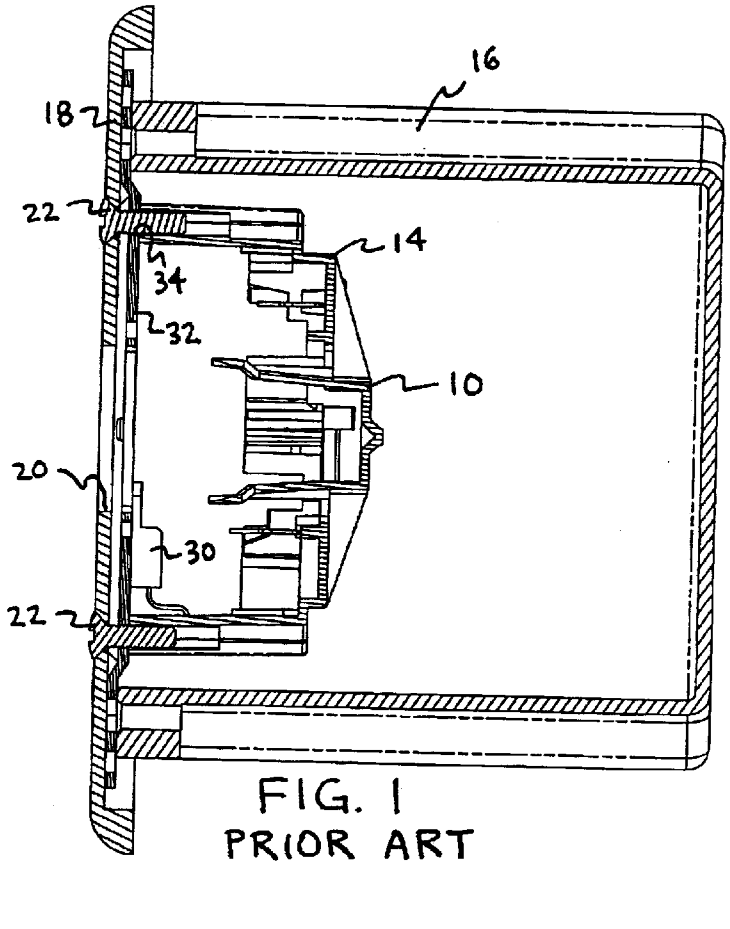
FIG. 1 PRIOR ART
FIG. 1 is a simplified side view in cross-section of a typical prior art dimmer.
Figure 4:
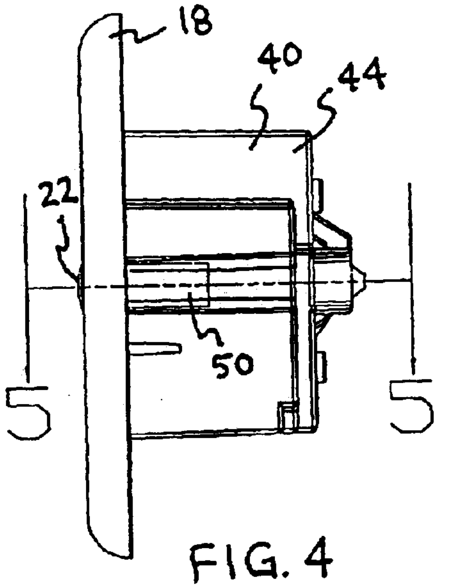
FIG. 4 is a top plan view of a dimmer and faceplate in accordance with a first embodiment of the present invention.
Figure 5:
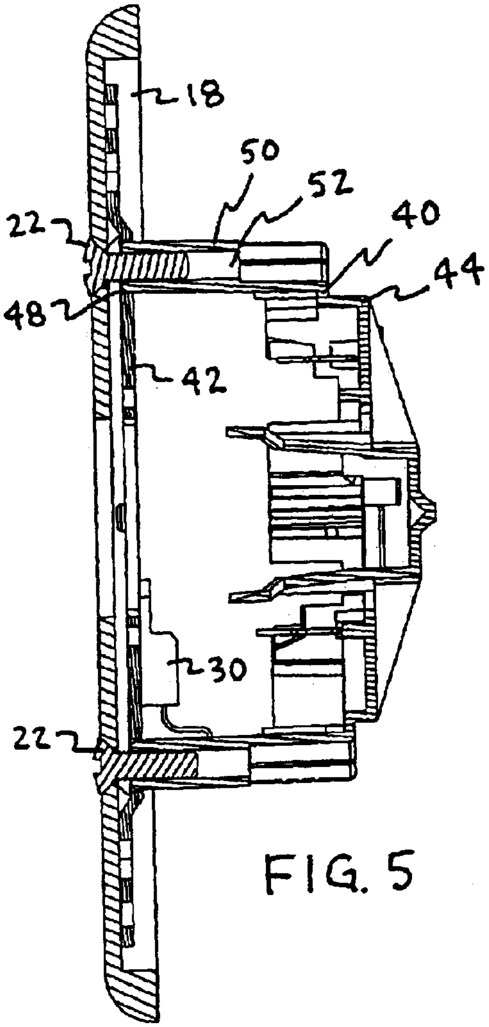
FIG. 5 is a side view in cross-section of the dimmer and faceplate of FIG. 4.
Figure 6:
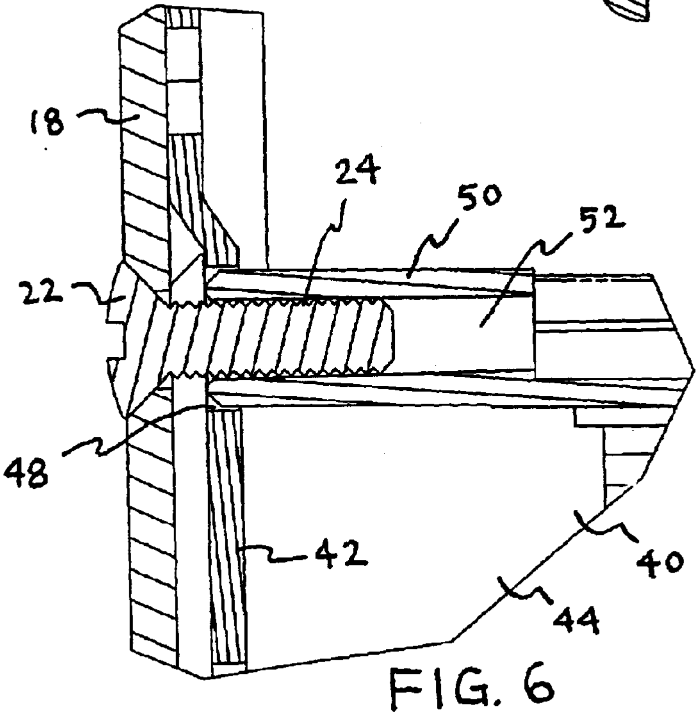
FIG. 6 is an enlarged side view of a portion of FIG. 5 illustrating the fastening of the faceplate to the dimmer at the site of the upper fastener.

In accordance with the present invention, a dimmer 40 (shown in FIGS. 3, 4, 5, and 6) of the type including a heat generating device 30, such as a triac, field-effect transistor, or the like, in thermal communication with a heat dissipating yoke 42, a body portion 44 secured to the yoke 42 and enclosing at least a portion of the heat generating device 30, is presented. The faceplate 18 may be attached to the front of the dimmer 40 with the fasteners 22 so that a user-accessible switch portion 36 having a pushbutton on/off switch 37 and a slide dimmer switch 38 extends through the switch opening 20.

The yoke 42 defines a first aperture 48 therethrough for receipt of the faceplate fastener 22 therethrough in non-contacting relationship. The fastener 22 is preferably a threaded steel screw, that may optionally be further secured to the dimmer 40 with a threaded nut (not shown).

Alternatively, the fastener may be a rivet, or a stab-in connector, or may have a split shank with outwardly biased shank portions.

The dimmer body portion 44 comprises a thermally insulating boss portion 50 defining a second fastener-receiving aperture 52. When the yoke 42 is secured to the dimmer body 44, the first aperture 48 is axially aligned with the second aperture 52 such that the faceplate fastener 22 is received within and extends through the first and second apertures 48, 52 to join a faceplate 18 to the front of the dimmer 40.

In a preferred embodiment, the boss 50 is formed integrally with the dimmer body 44, and is molded from a thermoplastic material such as NORYL® N225X, a modified polyphenylene ether, which is manufactured by General Electric Plastics of Pittsfield, Mass.

Aluminum may typically have a thermal conductivity on the order of about 237 W/m° C., while steel may typically have a thermal conductivity on the order of about 60 W/m° C. The boss 50 preferably has a thermal conductivity at least an order of magnitude less than that of steel, that is, no greater than about 6.00 W/m° C. More preferably, the boss 50 comprises a material having a thermal conductivity two orders of magnitude less than that for steel, that is, no greater than about 0.60 W/m° C. Even more preferably, the boss 50 has a thermal conductivity no greater than about 0.30 W/m° C., and most preferably, no greater than about 0.25 W/m° C. The thermoplastic material is also preferably electrically non-conducting, and may have a volume resistivity about 2.8E16 ohm-cm, and a surface resistivity in excess of about 1E14 ohm/square.

The second aperture 52 preferably defines an inner diameter proportioned to be slightly smaller than the largest outer diameter of the fastener 22. Preferably, the fastener 22 is a number six threaded steel screw and the boss comprises a suitably pliant material such that the fastener-receiving aperture 52 has a smooth bore and the screw 22 is self-tapping. That is, as the screw 22 is rotatably urged into the aperture 52, the threads 24 of the screw 22 (FIG. 6) deformably engage an inner surface of the aperture 52. The screw 22 is thereby supported to resist axial forces into and out of the aperture 52, while still allowing the screw 22 to be rotatably urged into and out of the aperture 52, such as by means of a screwdriver or the like. In an alternative embodiment, the boss 50 may be provided with internal threads adapted to cooperatively engage the corresponding threads of the screw 22.

Figure 7:
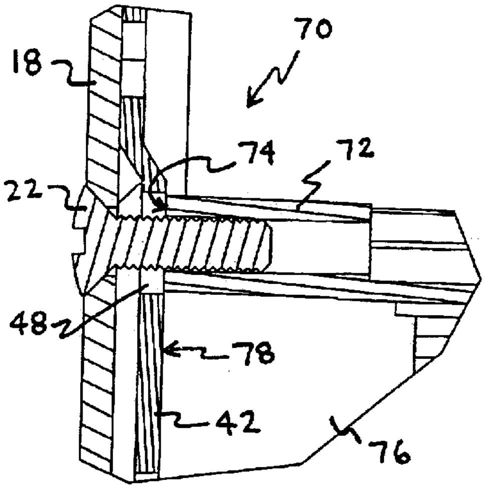
FIG. 7 is an enlarged view in cross-section of a portion of a dimmer, faceplate, and upper fastener in accordance with a second embodiment of the present invention.

Turning now to FIG. 7, there is shown another embodiment 70 of a dimmer in accordance with the present invention wherein no part of a boss 72 extends into the first aperture 48. The boss 72 of FIG. 7 has an end surface 74 that is substantially flush with the adjacent portion of the dimmer body 76 so that the end surface 74 lies substantially on a plane defined by an inner surface 78 of the yoke 42 adjacent the aperture 48. In an alternative embodiment, the end surface 74 of the boss 72 may be recessed a spaced distance from the inner surface 78 of the yoke 42.

Figure 8:
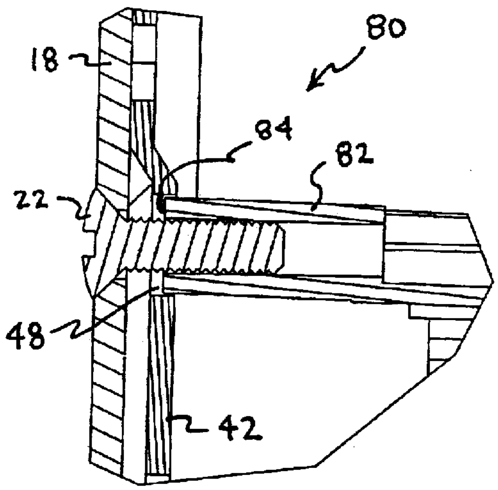
FIG. 8 is an enlarged view in cross-section of a portion of a dimmer, faceplate, and upper fastener in accordance with a third embodiment of the present invention.

Turning now to FIG. 8, there is shown another embodiment 80 of a dimmer in accordance with the present invention. In this dimmer 80, a boss 82 has an end surface 84 that extends at least part way into the first aperture 48.

Figure 9:
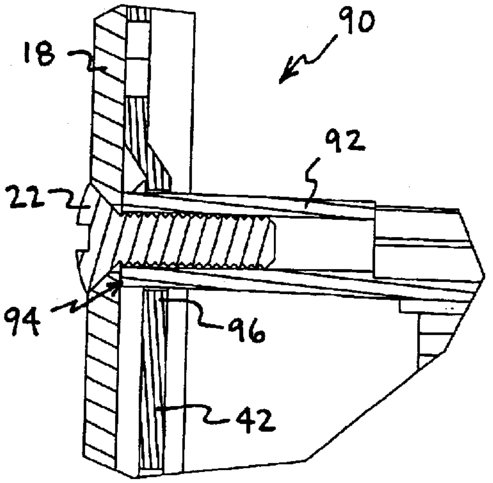
FIG. 9 is an enlarged view in cross-section of a portion of a dimmer, faceplate, and upper fastener in accordance with a fourth embodiment of the present invention.

Turning now to FIG. 9, there is shown another embodiment 90 of a dimmer in accordance with the present invention. In this dimmer 90, a boss 92 extends all of the way through the first aperture 48 and is adapted so that an end surface 94 of the boss 92 contacts the faceplate 18 so as to maintain the faceplate 18 at a predetermined distance from a portion 96 of the yoke 42 immediately adjacent the first aperture 48 when the faceplate 18 is secured to the dimmer 90. If so desired, the faceplate 18 may comprise a portion (not shown) that extends from the faceplate 18 to cooperatively engage the boss 92 at the end surface 94.

Figure 10:
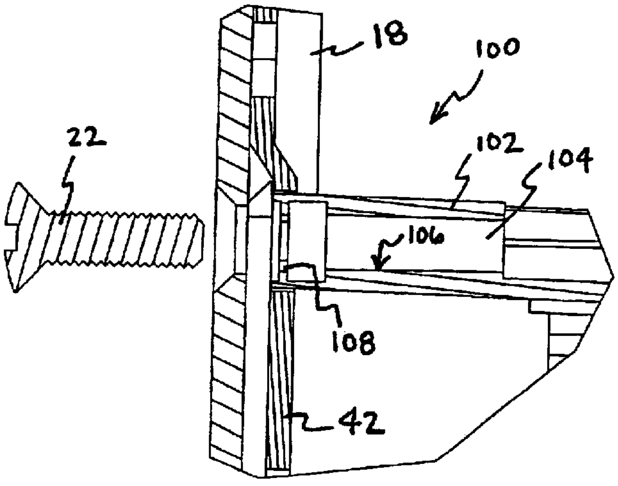
FIG. 10 is an enlarged exploded view in cross-section of a portion of a dimmer, faceplate, and upper fastener in accordance with a fifth embodiment of the present invention.

Turning now to FIG. 10, there is shown yet another embodiment 100 of a dimmer in accordance with the present invention. In this dimmer 100, a boss 102 further defines a fastener-retaining element 108 located inside a fastener-receiving aperture 104. The inner diameter of fastener-receiving aperture 104 is slightly smaller than the largest outer diameter of the fastener 22. In this embodiment 100, the fastener-retaining element 108 is a thin annular ring of material that extends radially inwardly from an interior surface 106 of the boss that defines the aperture 104. The thin, annular fastener-retaining element 108 defines an opening adapted to engage the fastener 22 in releasable, frictional engagement. This allows a user to temporarily seat the fastener 22 in the fastener-receiving aperture 104 so as to hold the fastener 22 in place, thereby freeing up one of the user's hands to perform another operation, such as positioning the faceplate, or operating a tool, such as a screwdriver, to fully insert the fastener 22 into the fastener-receiving aperture 104.

Although the boss 50 has been described as being preferably formed integrally with the body 44 of the dimmer 40, in an alternative embodiment (not shown), the boss 50 may further comprise a threaded insert or sleeve (not shown) adapted to threadedly receive the fastener 22. The insert or sleeve may comprise brass, or some other suitable material, and is thermally insulated from the yoke 42 by the surrounding portion of the boss 50.

It is to be understood that the foregoing illustrative embodiments have been provided merely for the purpose of explanation and are in no way to be construed as limiting the invention. Words that have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention.

What is claimed is:

1. A light dimmer including a heat generating device in thermal communication with a heat dissipating yoke, a body portion secured to the yoke and enclosing at least a portion of the heat generating device, the yoke defining a first aperture for receipt of a faceplate fastener therethrough, the improvement comprising:

said first aperture adapted to receive said fastener therethrough in non-contacting relationship; and said body portion further comprising a thermally insulating boss defining a second aperture in axial alignment with said first aperture, said second aperture adapted to receive said faceplate fastener in contacting relationship;

whereby said faceplate fastener received in said second aperture is thermally insulated from said heat generating device and said heat dissipating yoke.

2. The dimmer of claim 1 wherein no part of said boss extends into said first aperture.

3. The dimmer of claim 1 wherein a portion of said boss extends into said first aperture.

4. The dimmer of claim 3 wherein a portion of said yoke defining said first aperture further defines a substantially planar surface adapted to face toward a faceplate, said surface substantially normal to a central longitudinal axis of said second aperture; and said portion of said boss extending into said first aperture extends to a point no further than said surface.

5. The dimmer of claim 3 wherein said portion of said boss extending into said first aperture extends beyond said yoke and is adapted to contact a faceplate so as to maintain said faceplate at a predetermined distance from a portion of said yoke immediately adjacent said first aperture when said faceplate is secured to said dimmer.

6. The dimmer of claim 1 wherein said boss defines first threads adapted to cooperatively engage corresponding threads defined by said faceplate fastener.

7. The dimmer of claim 1 wherein said second aperture comprises an elongated smooth bore.

8. The dimmer of claim 7 wherein said bore has a diameter less than a diameter of said fastener.

9. The dimmer of claim 1 wherein said boss is formed as an integral part of said body portion.

10. The dimmer of claim 1 wherein said boss comprises electrically non-conductive material.

11. The dimmer of claim 1 wherein said boss comprises thermoplastic material.

12. The dimmer of claim 11 wherein said thermoplastic material comprises Noryl.

13. The dimmer of claim 1 wherein said boss has a thermal conductivity of no greater than about 0.30 Watts per meter degree Celsius.

14. The dimmer of claim 13 wherein said boss has a thermal conductivity no greater than about 0.25 Watts per meter degree Celsius.

15. The dimmer of claim 1 wherein said boss further defines a fastener retaining element adapted to releasably engage said fastener in frictional relationship when said fastener is forcibly urged into said second aperture.

16. The dimmer of claim 15 wherein said boss defines first threads adapted to cooperatively engage corresponding threads defined by said faceplate fastener.

17. The dimmer of claim 15 wherein said second aperture comprises an elongated smooth bore.

18. The dimmer of claim 17 wherein said bore has an inner diameter smaller than an outer diameter of said fastener.

19. In a light dimmer including a heat generating device in thermal communication with a heat dissipating yoke, a body portion secured to the yoke and enclosing at least a portion of the heat generating device, the yoke defining a first aperture for receipt of a faceplate fastener therethrough, a method for limiting the temperature rise of the fastener relative to ambient environmental conditions, comprising the steps of:

adapting said first aperture to receive said fastener therethrough in non-contacting relationship; and providing a thermally insulating boss in said body portion, said boss defining a second fastener-retaining aperture in axial alignment with said first aperture, said second aperture adapted to receive said fastener in contacting relationship.

* * * * *